No. 810,397.  
PATENTED JAN. 23, 1906.  
F. DENSMOOR.  
ROTARY CUTTER AND TOPPER.  
APPLICATION FILED DEC. 31, 1904.

WITNESSES:

INVENTOR  
Frank Densmoor  
BY Erwin & Wheeler  
ATTORNEYS

UNITED STATES PATENT OFFICE.

FRANK DENSMOOR, OF MARKESAN, WISCONSIN.

ROTARY CUTTER AND TOPPER.

No. 810,397.   Specification of Letters Patent.   Patented Jan. 23, 1906.

Application filed December 31, 1904. Serial No. 239,085.

To all whom it may concern:

Be it known that I, FRANK DENSMOOR, a citizen of the United States, residing at Markesan, county of Green Lake, and State of Wisconsin, have invented new and useful Improvements in Rotary Cutters and Toppers, of which the following is a specification.

My invention relates to improvements in rotary cutters and toppers.

The object of my invention is to provide a device of this class which will be especially adapted for the cutting of cornstalks, the same being attached to a corn harvester or binder in any convenient manner.

In the following description reference is had to the accompanying drawings, in which—

Figure 1:
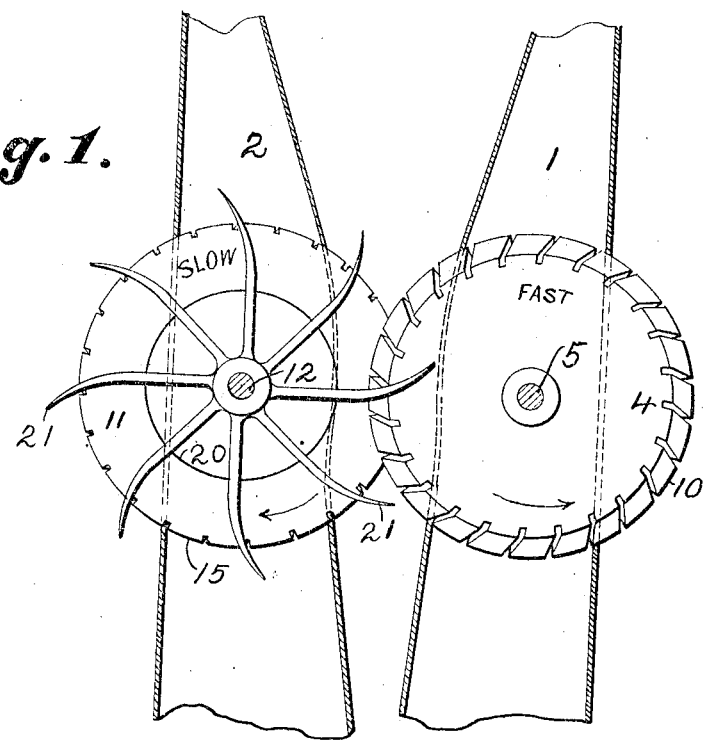
Figure 2:
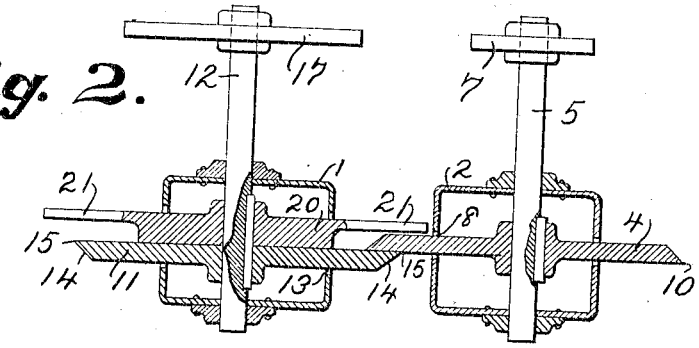

Figure 1 is a plan view of my invention, showing the gatherers and driving-shafts in horizontal section. Fig. 2 is a transverse sectional view drawn on the axes of the driving-shafts of the cutters.

Like parts are identified by the same reference characters in both views.

1 and 2 are the gatherers. These are arranged to form a supporting frame or housing for the cutters and extend divergingly forwardly for the purpose of gathering the stalks. The shape and style of these gatherers is not material to my invention, however, as any of the numerous devices of this character now in use may be employed. A rotary cutting-disk 4 is mounted on a shaft 5, which is preferably journaled in the frame of the gatherer 1 and is driven through a sprocket-wheel 7, mounted upon the shaft 5. The disk 4 projects through a slot 8 in the inner wall of the gatherer, and its margin is beveled downwardly and outwardly to a comparatively sharp edge at 10.

Another cutting-disk 11 is mounted on a shaft 12, journaled in the frame of the gatherer 2. This disk occupies a lower plane than the disk 4 and on the inner side extends through a slot 13 in the gatherer and laps underneath the inner edge of the disk 4 in approximate contact therewith. The margin 14 of this disk is beveled upwardly and outwardly, forming a comparatively sharp cutting edge at 15. The shaft 12 and disk 11 are driven through a sprocket-wheel 17 on the shaft 12. The disk 4 is driven at a much higher rate of speed than the disk 11, the sprocket-wheel 7 being made a little smaller than the sprocket-wheel 17 for that purpose. The sprocket-wheels 7 and 17 are separately driven, it being necessary to leave an open space above and below the meeting edges of the disks 4 and 11 for the stalks and stubble; but any suitable driving connections may be employed for transmitting motion to the disks from the machine to which my invention is applied.

The shaft 12 is provided with a wheel 20, having radially-projecting fingers 21, the latter being curved backwardly with reference to the direction of wheel rotation, the outer ends of the fingers being thus made to trail to some extent. These fingers 21, projecting over the inner edge of the disk 4, serve to direct the stalks into the angle formed by the lapping edges of the disks. The disks are driven in opposite directions, as indicated by arrows in Fig. 1.

The margins of both disks are provided with inwardly-extending slots subdividing the margins of the disks into teeth. The slots extend at an angle into the edges of the disks with a tangential pitch, so that the intervening teeth have a rake opposite that of disk rotation. In practice the slots are located in close proximity to each other, both the teeth and the slots being made as long as is practicable without unduly weakening the teeth. The cutting edges thus produced have been found efficient for cutting cornstalks or other substances having hard or glazed outer surfaces and an interior pith.

Having thus described my invention, what I claim as new, and desire to secure by Letters Patent, is—

1. In a device of the described class, the combination of a set of partially-overlapping rotary disks driven at different speeds; driving connections for each of said disks arranged to impart a different speed to one of the disks from that of the other, and a set of radially-projecting gathering-fingers rotating on the same axis with the more slowly moving disk and projecting over the inner edge of the more rapidly moving disk.

2. In a device of the described class, the combination of a set of rotary disks; a supporting-shaft for each of said disks; a set of gathering-fingers connected with one of said shafts; and means for driving said shafts at different rates of speed, the disk on one shaft having its inner edge interposed between the disk and gathering-fingers on the other shaft.

3. In a device of the described class, the combination of a set of rotary disks; a supporting-shaft for each of said disks; a set of gathering-fingers connected with one of said shafts; and means for driving said shafts at different rates of speed, the disk on one shaft having its inner edge interposed between the disk and gathering-fingers on the other shaft, and each of said disks having its margin beveled in the direction of the other.

4. In a device of the described class, the combination of a set of rotary disks; a supporting-shaft for each of said disks; a set of gathering-fingers connected with one of said shafts; and means for driving said shafts at different rates of speed, the disk on one shaft having its inner edge interposed between the disk and gathering-fingers on the other shaft, and each of said disks having its margin beveled in the direction of the other and slotted to form a series of teeth having an angular rake opposite that of disk rotation.

5. In a device of the described class, the combination of a set of driving-shafts; means for driving one of the shafts at a greater speed than the other; a disk mounted on the slower shaft; and a set of gathering-fingers mounted on said slower shaft above said disk; a disk mounted on the faster shaft and partially interposed between the disk on the slower shaft and said gathering-fingers; said disks having their margins beveled, each in the direction of the other and arranged to travel in approximate contact.

6. In a device of the described class, the combination of a set of driving-shafts; means for driving one of the shafts at a greater rate of speed than the other; a disk mounted on the slower shaft; and a set of gathering-fingers mounted on said slower shaft above said disk; a disk mounted on the faster shaft and partially interposed between the disk on the slower shaft and said gathering-fingers; said disks having their margins beveled each in the direction of the other, and arranged to travel in approximate contact; and disks being provided with marginal cutting-teeth.

In testimony whereof I affix my signature in the presence of two witnesses.

FRANK DENSMOOR.

Witnesses:
JOHN L. MILLARD,
JAS. R. DENSMOOR.